US012125406B1

(12) United States Patent
Liu et al.

(10) Patent No.: US 12,125,406 B1
(45) Date of Patent: Oct. 22, 2024

(54) SEMANTIC REASONING METHOD AND TERMINAL FOR LEARNING TARGET IN EDUCATION METAVERSE

(71) Applicants: Fujian TQ Digital Inc., Fuzhou (CN); Central China Normal University, Wuhan (CN)

(72) Inventors: Dejian Liu, Fuzhou (CN); Ronghua Wu, Fuzhou (CN); Zheng Zhong, Wuhan (CN); Jian Xu, Wuhan (CN)

(73) Assignees: FUJIAN TQ DIGITAL INC., Fuzhou (CN); CENTRAL CHINA NORMAL UNIVERSITY, Wuhan (CN)

( * ) Notice: Subject to any disclaimer, the term of this patent is extended or adjusted under 35 U.S.C. 154(b) by 0 days.

(21) Appl. No.: 18/610,111

(22) Filed: Mar. 19, 2024

(30) Foreign Application Priority Data

Nov. 3, 2023 (CN) ......................... 202311451652.2

(51) Int. Cl.
*G09B 5/02* (2006.01)
*G06F 40/284* (2020.01)
*G06F 40/30* (2020.01)

(52) U.S. Cl.
CPC ............. *G09B 5/02* (2013.01); *G06F 40/284* (2020.01); *G06F 40/30* (2020.01)

(58) Field of Classification Search
CPC .......... G09B 5/02; G06F 40/284; G06F 40/30
See application file for complete search history.

(56) References Cited

U.S. PATENT DOCUMENTS

2022/0147715 A1* 5/2022 Wang .................... G06F 40/284
2023/0028944 A1* 1/2023 Chen .................... G06V 30/262
(Continued)

FOREIGN PATENT DOCUMENTS

CN 109062939 A 12/2018
CN 116229776 A 6/2023
CN 116524791 A 8/2023
(Continued)

OTHER PUBLICATIONS

First Office Action issued in counterpart Chinese Patent Application No. 202311451652.2, dated Dec. 14, 2023.
(Continued)

*Primary Examiner* — Eddy Saint-Vil
(74) *Attorney, Agent, or Firm* — Stein IP LLC

(57) ABSTRACT

Disclosed are a semantic reasoning method and a terminal for a learning target in an education metaverse. The method includes receiving a description text of a learning target, segmenting the description text into a lexical item sequence, extracting an entry from the lexical item sequence, extracting a semantic lexical item based on the entry, and mapping the semantic lexical item into a first word vector. By capturing the semantic feature vector in the word vector, the subject and knowledge points in the learning target are obtained by reasoning, the target knowledge points of the learning target are determined and positioned, and the association relationship between the target knowledge points is obtained, so that the semantic information of the learning target can be fully mined, and the accuracy of the learning target extraction can be improved. It matches with the corresponding teaching scene based on the learning targets.

7 Claims, 9 Drawing Sheets

(56) References Cited

U.S. PATENT DOCUMENTS

| | | | | |
|---|---|---|---|---|
| 2023/0084910 | A1 | 3/2023 | Wang et al. | |
| 2024/0046122 | A1* | 2/2024 | Lin | G06F 40/30 |

FOREIGN PATENT DOCUMENTS

| | | | |
|---|---|---|---|
| CN | 116561533 | A | 8/2023 |
| JP | H08147307 | A | 6/1996 |

OTHER PUBLICATIONS

Han et al., Relation extraction of Chinese STEM course knowledge based on feature enhancement, Application Research of Computers, 2020, S1, pp. 40-42, dated Jun. 30, 2020.

* cited by examiner

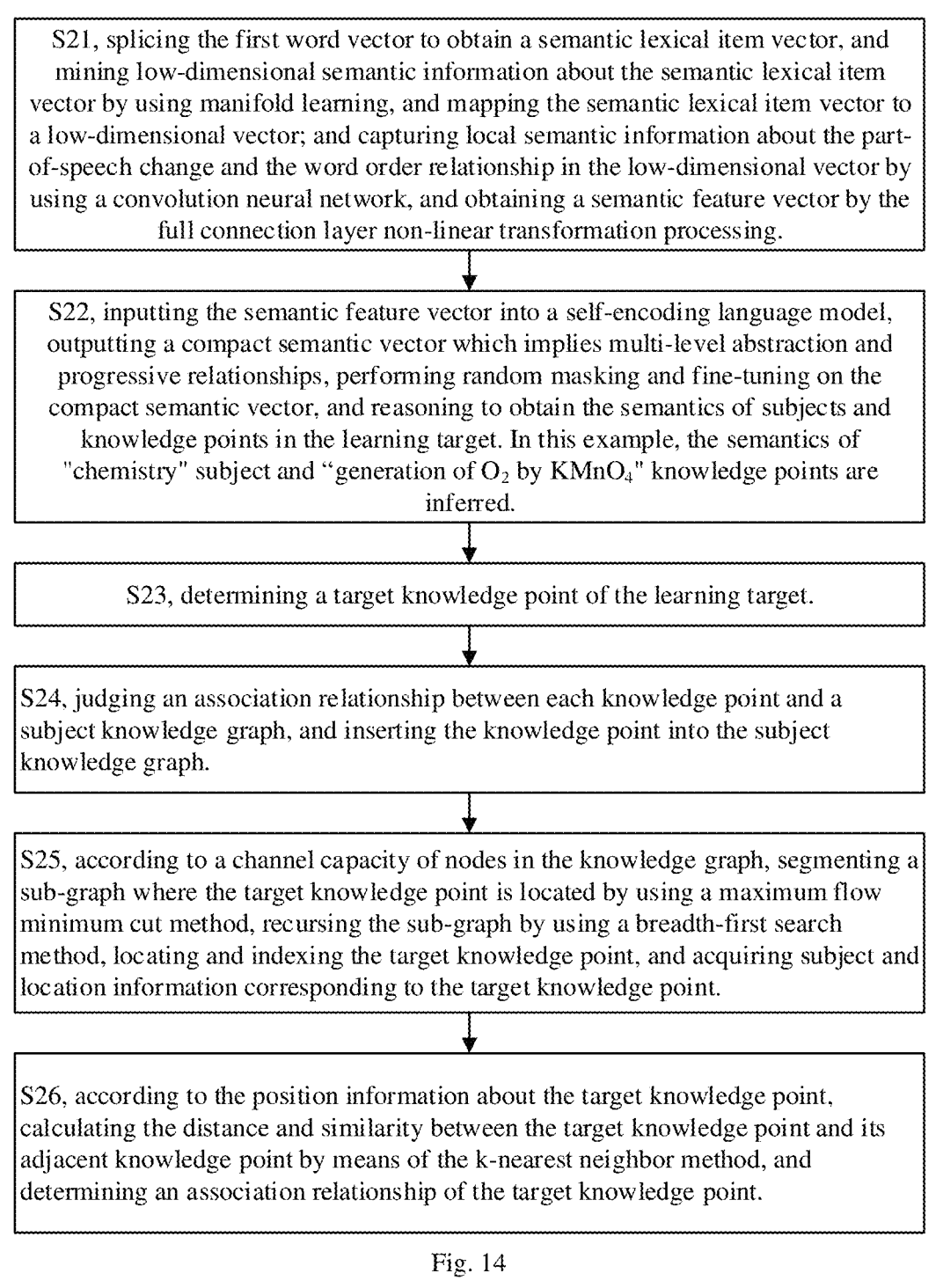

S21, splicing the first word vector to obtain a semantic lexical item vector, and mining low-dimensional semantic information about the semantic lexical item vector by using manifold learning, and mapping the semantic lexical item vector to a low-dimensional vector; and capturing local semantic information about the part-of-speech change and the word order relationship in the low-dimensional vector by using a convolution neural network, and obtaining a semantic feature vector by the full connection layer non-linear transformation processing.

↓

S22, inputting the semantic feature vector into a self-encoding language model, outputting a compact semantic vector which implies multi-level abstraction and progressive relationships, performing random masking and fine-tuning on the compact semantic vector, and reasoning to obtain the semantics of subjects and knowledge points in the learning target. In this example, the semantics of "chemistry" subject and “generation of $O_2$ by $KMnO_4$" knowledge points are inferred.

↓

S23, determining a target knowledge point of the learning target.

↓

S24, judging an association relationship between each knowledge point and a subject knowledge graph, and inserting the knowledge point into the subject knowledge graph.

↓

S25, according to a channel capacity of nodes in the knowledge graph, segmenting a sub-graph where the target knowledge point is located by using a maximum flow minimum cut method, recursing the sub-graph by using a breadth-first search method, locating and indexing the target knowledge point, and acquiring subject and location information corresponding to the target knowledge point.

↓

S26, according to the position information about the target knowledge point, calculating the distance and similarity between the target knowledge point and its adjacent knowledge point by means of the k-nearest neighbor method, and determining an association relationship of the target knowledge point.

Fig. 14

SEMANTIC REASONING METHOD AND TERMINAL FOR LEARNING TARGET IN EDUCATION METAVERSE

CROSS-REFERENCE TO RELATED APPLICATIONS

This application claims priority to Chinese Patent Application No. 202311451652.2, filed on Nov. 3, 2023, the content of which is incorporated herein by reference in its entirety.

TECHNICAL FIELD

The application relates to the technical field of teaching application of metaverse, and in particular, to a semantic reasoning method and a terminal for a learning target in an education metaverse.

BACKGROUND

AIGC (Generative Artificial Intelligence) uses techniques such as machine learning, natural language processing and computer vision to learn and recognize patterns in massive data, and automatically generates creative and complex content based on artificial intelligence. Applying AIGC in the field of education can automatically generate teaching resources. AIGC is used to construct the semantic reasoning engine of learning targets, which can enrich the semantic and reasoning process of learning targets, achieve more efficient and accurate generation and interaction of teaching resources, enhance learners' learning experience and effect, expand the generation mode of teaching scene in the metaverse, and change the supply mode of teaching resources in the metaverse. It has broad application prospects.

At present, although the semantic reasoning can be used to infer teacher-defined learning targets, there are no entries and adjacent knowledge points matching the learning targets. At the same time, it is difficult to organize and aggregate teaching resources from different sources, and it is also necessary to manually mark the complex and tedious association relationship between the teaching resources. Therefore, in the education metaverse, the combination of AIGC and semantic reasoning of learning targets requires the use of subject knowledge graph, with the use of in-depth learning, natural language processing and other technologies to infer subject and knowledge point semantic information, matching or generating teaching scene.

Therefore, there are many problems in the semantic reasoning of the learning targets in the education metaverse.

Firstly, it does not consider entries and adjacent knowledge points during the semantic reasoning of the learning targets. It is difficult to fully mine the semantic information of learning targets only by using the knowledge graph to infer learning target, which leads to inaccurate extraction of learning targets.

Secondly, the combination of the semantic reasoning of the learning targets and the AIGC technology is not tight. At present, as most of the generated teaching resources come from the existing teaching resource library, it is difficult to effectively organize and aggregate multi-source teaching resources.

Lastly, interaction between models is not automatically associated. The interactive behavior of existing teaching resources often needs manual editing, which is tedious and complex, and lacks automated association process.

SUMMARY

The technical problem to be solved by the application is to provide a semantic reasoning method and terminal for a learning target in an education metaverse, which can improve the accuracy of semantic extraction of learning targets and automatically associate teaching resources according to the extracted learning targets.

In order to solve the technical problems, the technical solution provided by the application is as follows.

A semantic reasoning method for a learning target in an education metaverse comprises the steps of:

- receiving a description text of an input learning target, segmenting the description text into a lexical item sequence, extracting an entry from the lexical item sequence, extracting a semantic lexical item based on the entry, and mapping the semantic lexical item into a first word vector;
- by capturing a semantic feature vector in the first word vector, reasoning to obtain subjects and knowledge points in the learning target, determining a target knowledge point of the learning target, positioning and indexing the target knowledge point, and determining an association relationship of the target knowledge points;
- matching the corresponding teaching scene based on the learning target, integrating the matched teaching scene and the association relationship between the subject and the knowledge point in the learning target into a teaching model; and
- establishing an interaction relationship between each teaching model.

In order to solve the above-mentioned technical problems, the other technical solution provided by the application is as follows.

A semantic reasoning terminal for a learning target in an education metaverse comprises a memory, a processor and a computer program stored on the memory and running on the processor, wherein the processor, when executing the computer program, implements the steps of the semantic reasoning method for the learning target in the education metaverse.

The advantageous effect of the application lies in receiving a description text of a learning target, segmenting the description text into a lexical item sequence, extracting an entry from the lexical item sequence, extracting a semantic lexical item based on the entry, and mapping the semantic lexical item into a first word vector; in this way, automatically extracting the lexical item in the text, and converting same into a word vector for standardization processing. By capturing the semantic feature vector in the word vector, the subject and knowledge points in the learning target are obtained by reasoning, and the target knowledge points of the learning target are determined. The target knowledge points are positioned and indexed to determine the association relationship of the target knowledge points. Therefore, the subject and knowledge points can be extracted according to the word vector of the learning target, and the association of the knowledge points can be performed, so as to fully mine the semantic information of the learning target and improve the accuracy of the extraction of the learning target. It matches with the corresponding teaching scene based on the learning targets. The matched teaching scene and the association relationship between subjects and knowledge points in the learning target are integrated into the teaching model, and the interaction relationship between each teaching model is established. In this way, the multi-source teaching resources can be effectively organized and aggregated, and the correlation between the models can be achieved.

BRIEF DESCRIPTION OF THE DRAWINGS

FIG. 14 is a flowchart of steps for determining an association relationship of the target knowledge points according to an embodiment of the application.

DETAILED DESCRIPTION OF THE EMBODIMENTS

In order to explain the technical contents, achieved objects and effects of the application in detail, it is described in combination with the detailed description and the accompanying drawings.

Figure 1:
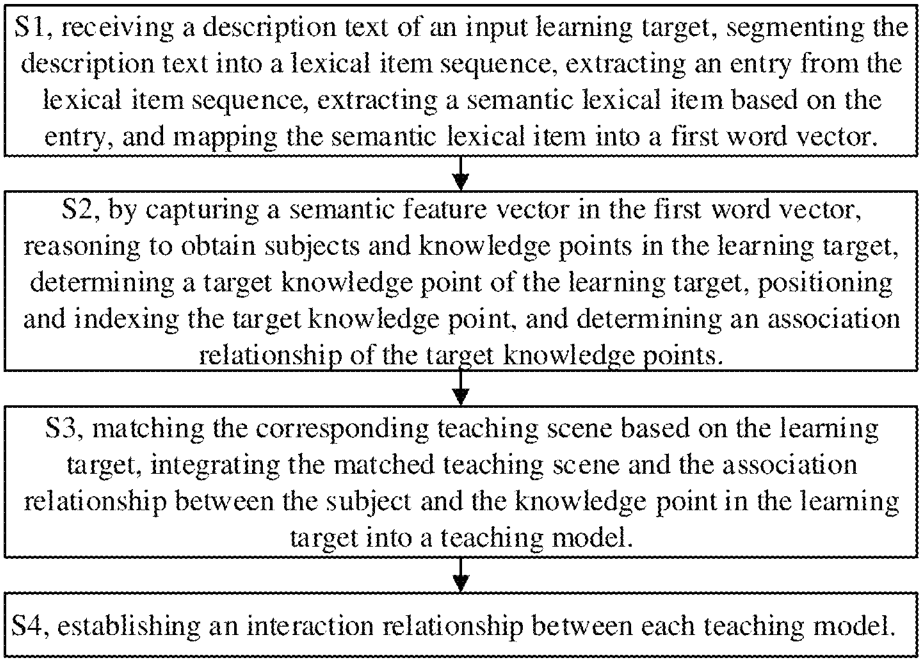
FIG. 1 is a flowchart of a semantic reasoning method for a learning target in an education metaverse according to an embodiment of the application.

With reference to FIG. 1, an embodiment of the application provides a semantic reasoning method for a learning target in an education metaverse, including the steps of:

- receiving a description text of an input learning target, segmenting the description text into a lexical item sequence, extracting an entry from the lexical item sequence, extracting a semantic lexical item based on the entry, and mapping the semantic lexical item into a first word vector;
- by capturing a semantic feature vector in the first word vector, reasoning to obtain subjects and knowledge points in the learning target, determining a target knowledge point of the learning target, positioning and indexing the target knowledge point, and determining an association relationship of the target knowledge points;
- matching the corresponding teaching scene based on the learning target, integrating the matched teaching scene and the association relationship between the subject and the knowledge point in the learning target into a teaching model; and
- establishing an interaction relationship between each teaching model.

As apparent from the above description, the application has an advantageous effect in receiving a description text of a learning target, segmenting the description text into a lexical item sequence, extracting an entry from the lexical item sequence, extracting a semantic lexical item based on the entry, and mapping the semantic lexical item into a first word vector; in this way, automatically extracting the lexical item in the text, and converting same into a word vector for standardization processing. By capturing the semantic feature vector in the word vector, the subject and knowledge points in the learning target are obtained by reasoning, and the target knowledge points of the learning target are determined. The target knowledge points are positioned and indexed to determine the association relationship of the target knowledge points. Therefore, the subject and knowledge points can be extracted according to the word vector of the learning target, and the association of the knowledge points can be performed, so as to fully mine the semantic information of the learning target and improve the accuracy of the extraction of the learning target. It matches with the corresponding teaching scene based on the learning targets. The matched teaching scene and the association relationship between subjects and knowledge points in the learning target are integrated into the teaching model, and the interaction relationship between each teaching model is established. In this way, the multi-source teaching resources can be effectively organized and aggregated, and the correlation between the models can be achieved.

Further, the segmenting the description text into a lexical item sequence includes:

- segmenting the description text into the lexical item sequence by using hybrid lexical segmentation, and marking the part-of-speech of each lexical item in the lexical item sequence.

It can be seen from the above-mentioned description that word segmentation is performed on text so as to obtain lexical items, and part of speech marking is performed on lexical items so as to facilitate subsequent term recognition and semantic extraction from the lexical item sequence.

Further, the extracting an entry from the lexical item sequence includes:

- identifying and extracting independent terms and joint terms in the lexical item sequence;
- using the independent term as a title of the learning target; and
- splitting the joint term, matching a corresponding subject entry library according to a subject category to which the title belongs, and extracting an entry corresponding to the title based on the splitting result of the joint term.

It can be seen from the above-mentioned description that the title of the learning target can be obtained by term extraction in the lexical item sequence, and then the entry of the learning target can be obtained by matching an associated subject lexical item library, so as to further improve the accuracy of semantic extraction of the learning target.

Further, the extracting a semantic lexical item based on the entry includes:

acquiring a relationship feature vector of an entry and lexical item context, using a forward maximum matching method to extract a lexical item to be segmented in the entry and mapping same to a second word vector, and judging whether a splicing result between the second word vector and the relationship feature vector is an entry and lexical item by using a long short-term memory network classifier; and if so, calculating a semantic weight value of the entry and lexical item, sorting the entry and lexical item according to the weight value, and extracting a semantic lexical item according to the sorting result.

It can be seen from the above-mentioned description that the accuracy of semantic extraction can be further ensured by combining the feature vector of the relationship between the lexical item context and the word vector of the entry, and comparing same with the entry and lexical item.

Further, the reasoning to obtain subjects and knowledge points in the learning target by capturing a semantic feature vector in the first word vector includes:

splicing the first word vector to obtain a semantic lexical item vector, and mining low-dimensional semantic information about the semantic lexical item vector by using manifold learning, and mapping the semantic lexical item vector to a low-dimensional vector;

capturing local semantic information about the part-of-speech change and the word order relationship in the low-dimensional vector by using a convolution neural network, and obtaining a semantic feature vector by the full connection layer non-linear transformation processing;

inputting the semantic feature vector into a self-encoding language model, outputting a compact semantic vector which implies multi-level abstraction and progressive relationships, performing random masking and fine-tuning on the compact semantic vector, and reasoning to obtain the semantics of subjects and knowledge points in the learning target.

It can be seen from the above-mentioned description that the word vector can be processed more standardly by calculating a semantic weight value of a lexical item, sorting a lexical item sequence according to the weight value, extracting a semantic lexical item, and mapping the semantic lexical item into a first word vector.

Further, the positioning and indexing the target knowledge point and determining an association relationship of the target knowledge point includes:

judging an association relationship between each knowledge point and a subject knowledge graph, and inserting the knowledge point into the subject knowledge graph;

according to a channel capacity of nodes in the knowledge graph, segmenting a sub-graph where the target knowledge point is located by using a maximum flow minimum cut method, recursing the sub-graph by using a breadth-first search method, locating and indexing the target knowledge point, and acquiring subject and location information corresponding to the target knowledge point; and according to the position information about the target knowledge point, calculating the distance and similarity between the target knowledge point and its adjacent knowledge point by means of k-nearest neighbor method, and determining an association relationship of the target knowledge point.

It can be seen from the above-mentioned description that entries and adjacent knowledge points can be considered during the semantic reasoning process of the learning targets, the semantic information of the learning targets can be fully mined, and the accuracy of the learning target extraction can be improved.

Further, the matching the corresponding teaching scene based on the learning target includes:

searching for a teaching scene in a teaching scene model library, and judging whether there is a teaching scene of which the similarity degree with the learning target exceeds a threshold value; if so, selecting the teaching scene of which the similarity degree is highest; otherwise, invoking a scene model corresponding to the learning target, and using a scale normalization algorithm to set the size and visible range of the scene model.

It can be seen from the above-mentioned description that by matching a corresponding teaching scene for a learning object, it is convenient to integrate multi-dimensional learning target information subsequently, so as to automatically realize the process from the learning target to the scene generation in the education metaverse.

Further, the integrating the matched teaching scene and the association relationship between the subject and the knowledge point in the learning target into a teaching model further includes:

acquiring all teaching models associated with the adjacent knowledge points by using the depth-first search traversal algorithm, and determining the presentation order of teaching models according to the scale of teaching scene and the distance and proximity of observers.

Further, the establishing an interaction relationship between each teaching model comprises:

extracting the interaction relationship between different teaching models according to the subject to which the learning target belongs and the knowledge point semantics; and describing and binding the interaction behavior and events of each model by the scripting language, grouping the interaction relationship of teaching models in the scene, and constructing the interaction network between the teaching models.

It can be seen from the above-mentioned description that, by realizing automatic association of interaction behaviors between models, an automatic association process can be realized compared with the problem of manual editing being required for interaction behaviors of teaching resources in the prior art.

Figure 2:
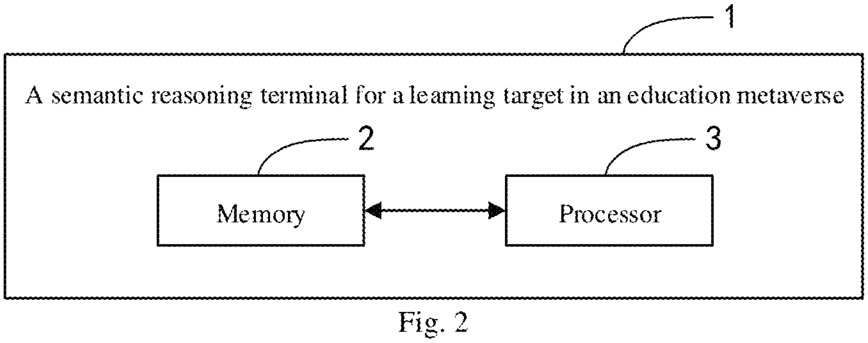
FIG. 2 is a schematic diagram of a semantic reasoning terminal for a learning target in an education metaverse according to an embodiment of the application.

Referring to FIG. 2, another embodiment of the application provides a semantic reasoning terminal for a learning target in an education metaverse including a memory, a processor and a computer program stored on the memory and running on the processor, wherein the processor, when executing the computer program, implements the steps of the semantic reasoning method for the learning target in the education metaverse.

The above-mentioned semantic reasoning method and terminal for the learning target in the education metaverse of the application are suitable for improving the accuracy of semantic extraction of the learning target and automatically associating teaching resources according to the extracted learning target. The following is illustrated by specific embodiments.

Example 1

Figure 13:
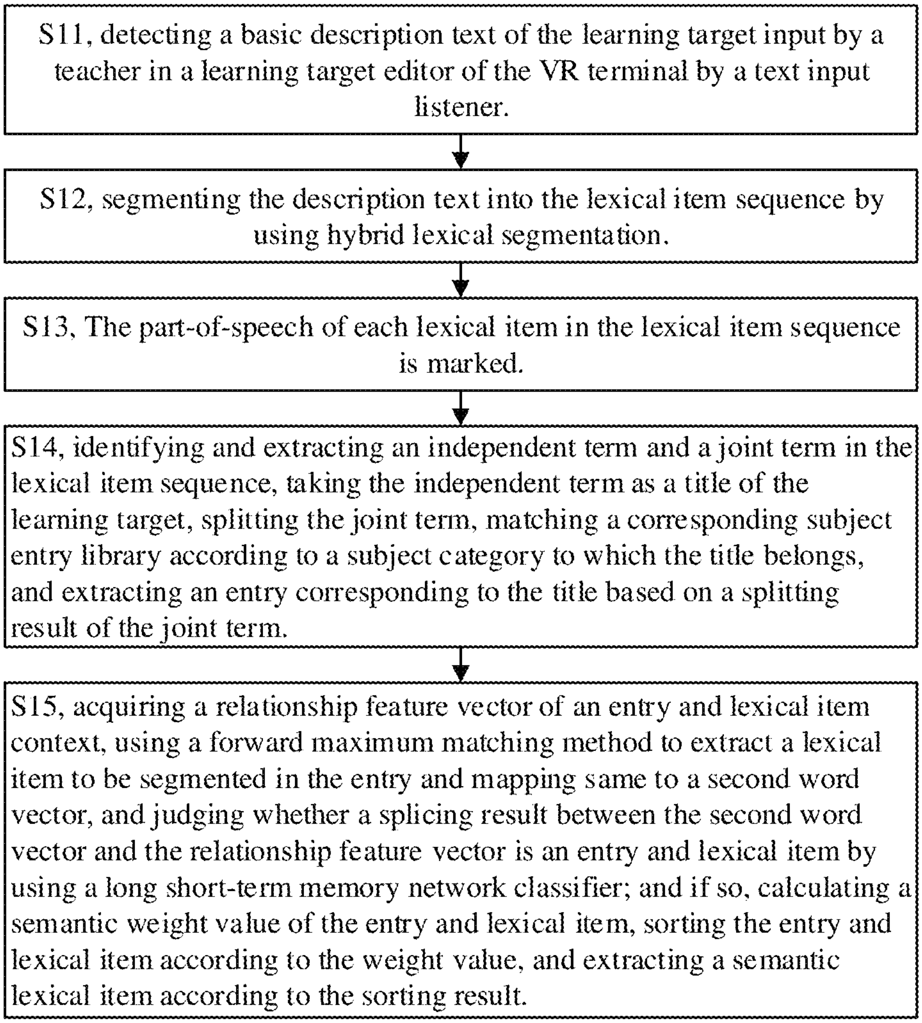
FIG. 13 is a flowchart of steps for generating a first word vector according to an embodiment of the application.

With reference to FIG. 1 and FIG. 13, a semantic reasoning method for a learning target in an education metaverse includes the steps of:

S1, receiving a description text of an input learning target, segmenting the description text into a lexical item sequence, extracting an entry from the lexical item sequence, extracting a semantic lexical item based on the entry, and mapping the semantic lexical item into a first word vector;

S11, detecting a basic description text of the learning target input by a teacher in a learning target editor of the VR terminal by a text input listener;

S12, segmenting the description text into the lexical item sequence by using hybrid lexical segmentation.

In the present embodiment, the hybrid lexical segmentation is specifically a lexical segmentation according to the structure of (behavior condition) {degree of expression/behavior criterion} [verb] "knowledge point/behavior object"<comment>. Specifically, the teacher may enter a basic description of a learning target in a learning target editor of the VR terminal, such as, (possessing basic knowledge of chemical experiment) {Skilled operation} [Mastery] "$O_2$ generation experiment"<chemical reaction>. The text input monitor interface is used to detect the text input by teacher, and the text is corrected by using the edit distance and character string matching method.

Herein, the specific steps of the error correction text are as follows.

1. "Raising the glass chemical experiment nature of accounting knowledge" is segmented into a lexical item sequence of {"raising the glass", "chemical experiment", "of", "nature of accounting" and "knowledge" } by using the positive maximum matching algorithm.
2. Incorrect lexical items as {"raising the glass" and "nature of accounting" } are obtained by using an algorithm based on an edit distance.
3. The incorrect lexical items {"possessing", "basic" } are matched by using a language model.
4. The incorrect lexical item in the lexical item sequence is replaced to obtain the error correction text as "possessing basic knowledge of chemical experiments".

S13, The part-of-speech of each lexical item in the lexical item sequence is marked.

Specifically, after dividing the text input by the teacher according to the language structure, the text is divided into lexical item sequences ["possessing", "basic knowledge of chemical experiments", "proficiency", "operation", "mastery", "chemical reaction" and "$O_2$ generation experiments" ] by using the hybrid word segmentation algorithm, combined with the context of the lexical item, the lexical item is marked as adjectives, verbs, nouns, adverbs, pronouns, pronouns, prepositions, conjunctions and exclamations by using the depth learning-based part-of-speech tagging algorithm, and is represented by a, v, n, d, r, m, p, c and e, respectively, then the lexical item is marked as: ("possessing", v), ("basic knowledge of chemical experiments", n), ("proficiency", a), ("operation", v), ("mastery", v), ("chemical reactions", v), ("$O_2$ generation experiments", n).

S14, identifying and extracting an independent term and a joint term in the lexical item sequence, taking the independent term as a title of the learning target, splitting the joint term, matching a corresponding subject entry library according to a subject category to which the title belongs, and extracting an entry corresponding to the title based on a splitting result of the joint term.

Specifically, the entry is extracted. The template of "Modified Terms+Central Terms" is used to match the textbook catalogue of the subject, so as to identify and extract the independent terms and joint terms in the lexical item sequence. The independent terms are directly used as titles, while the joint terms are treated by the resolution method. According to the subject category to which the title belongs, it is matched with the subject entry library so as to extract the entry corresponding to the title.

The specific steps for extracting the entries are as follows.

1. If a lexical item in a lexical item sequence can be regarded as an independent noun, verb or adjective, then the lexical item is regarded as an independent term, otherwise it is a joint term.
2. The independent term in the extracted lexical item sequence is {"chemical reaction", "$O_2$ generation experiments" }, and the joint term is {"basic knowledge of chemical experiments" }.
3. The joint terms is processed by the resolution method to obtain "chemical experiments" and "basic knowledge";
4. "Chemical reaction", "$O_2$ generation experiments", "chemical experiments" and "basic knowledge" are taken as the title.
5. According to the category of chemistry subject to which the title belongs, it matches the entry library of chemistry subject, extract the entries of "$O_2$ generation experiments", "chemical reaction", "chemical experiments" and "basic knowledge":

$O_2$ generation experiments: the preparation of $O_2$ from potassium permanganate ($KMnO_4$) is a common preparation method of $O_2$, which uses the decomposition reaction of $KMnO_4$ to prepare $O_2$;

Chemical reaction: it means a chemical process that acts between two or more substances to produce one or more new substances;

Chemical experiments: using experimental methods to study and understand an activity of a chemical system;

Basic knowledge: the most basic, core and common knowledge in a certain field is the premise and basis for learning and mastering the knowledge in this field.

S15, acquiring a relationship feature vector of an entry and lexical item context, using a forward maximum matching method to extract a lexical item to be segmented in the entry and mapping same to a second word vector, and judging whether a splicing result between the second word vector and the relationship feature vector is an entry and lexical item by using a long short-term memory network classifier; and if so, calculating a semantic weight value of the entry and lexical item, sorting the entry and lexical item according to the weight value, and extracting a semantic lexical item according to the sorting result.

Specifically, the lexical item to be segmented is extracted by using the forward maximum matching algorithm. A long short-term memory network classifier is used to judge whether the lexical item to be segmented is an entry lexical item. If so, the semantic weight value of the lexical item is calculated by using the TF-IDF algorithm, the lexical item sequence is sorted according to the weight value, and the semantic lexical item is extracted. A converter model is constructed to map semantic terms into word vectors, and the word vectors are normalized.

Figure 12:
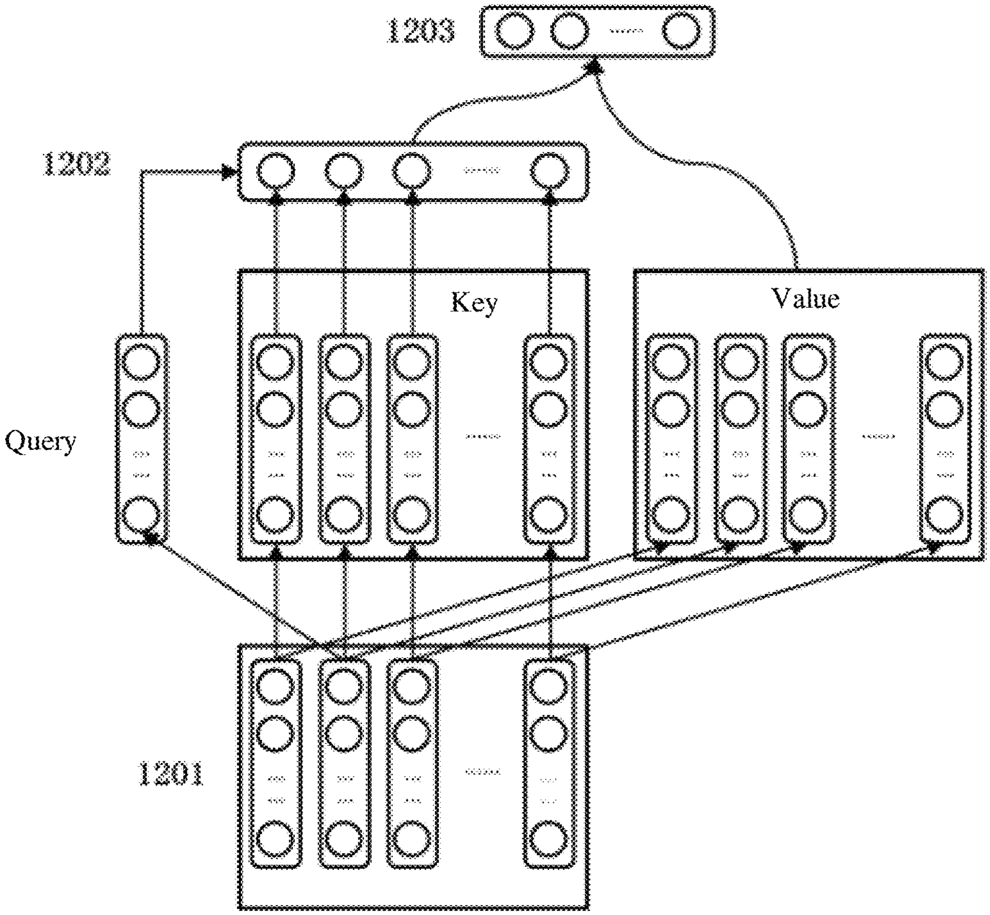
FIG. 12 is a structural schematic view of a self-encoding language model based on deep learning according to an embodiment of the application.

Referring to FIG. 12, 1201 represents a semantic feature vector, 1202 represents an attention weight, and 1203 represents a compact semantic vector. In the present embodiment, the entry extracted in step S14 is firstly processed by using a cyclic neural network layer to obtain a entry and lexical item context relationship feature vector. The entry is segmented by using the forward maximum matching algorithm to extract all the lexical items to be segmented. The lexical item to be segmented is mapped as a word vector by using a word vector model. The relationship feature vector and the word vector are spliced by using the long short-term memory network classifier to judge whether it is a lexical item of the entry, "$KMnO_4$", "preparation", "$O_2$", "is", "a", "common", "$O_2$", "preparation", "method", "using", "$KMnO_4$", "decomposition reaction", "prepared", and "$O_2$".

Then, the lexical item sequence is processed by the smoothing algorithm based on the count value distribution. The frequency of each lexical item is counted. The frequency threshold is set. The low-frequency lexical item is deleted. The semantic weight value of each lexical item is calculated by the TF-IDF algorithm. The lexical item sequence is arranged from large to small according to the normalized processing weight result so as to extract the semantic lexical item.

The specific steps for calculating the semantic weight value by the TF-IDF are as follows.

1. The lexical item sequence of the entry "$O_2$ generation experiments" is defined as $\{W_{KMnO_4}, W_{prepared}, W_{O_2}, W_{is}, W_{a}, W_{common}, W_{O_2}, W_{preparation}, W_{method}, W_{use}, W_{KMnO_4}, W_{decomposition\ reaction}, W_{prepared}, W_{O_2}\}$.
2. The word frequency $TF_W$ of lexical item is calculated:

$$TF_W = \frac{f_W}{N_{O_2 generation\ experiments}};$$

where $f_W$ represents the number of occurrences of the lexical item W, and $N_{O_2\ generation\ experiments}$ represents the number of lexical items in the entry "O2 generation experiments".

3. The inverse document frequency of lexical items is calculated:

$$IDF_W = \log\left(\frac{C}{C_W + 1}\right);$$

where C is the total number of the entries extracted in step S14, and $C_W$ represents the number of the entry containing a lexical item W.

4. The semantic weight value of the lexical item is calculated: $S_W = TF_W \times IDF_W$.
5. the semantic weight of the lexical item in the entry "$O_2$ generation experiment" is calculated as: $S_{KMnO_4}$=0.267, $S_{prepared}$=0.117, $S_{O_2}$=0.178, $S_{is}$=0.001, $W_a$=0.002, $W_{common}$=0.0001, $W_{preparation}$=0.002, $W_{method}$=0.04, $W_{using}$=0.02, $W_{decomposition}$=0.06.
6. The semantic weights of the lexical items are sorted. The semantic weight threshold is set to 0.1, and the semantic lexical items "$KMnO_4$", "prepared" and "$O_2$" are extracted.

Finally, a converter model based on deep learning is constructed by using parameters, such as the dimension of word vector, learning rate, regularization coefficient, iteration number, optimizer, activation function, batch size, discard rate and context window size. The semantic lexical items are mapped into word vectors, and the word vectors are processed by the Z-score standardization algorithm to obtain standard semantic lexical item vectors.

Herein, the specific steps of mapping the word vector are as follows.

1. The semantic lexical items "$KMnO_4$", "prepared" and "$O_2$" are obtained.
2. A semantic lexical item is converted into a word vector: V=glove (W); where glove represents a GloVe word vector model, and W and V respectively represent a semantic lexical item and a vector corresponding thereto.
3. The obtained word vector of the semantic lexical item is $KMnO_4$: [−1.1 −0.4 1.0 0.8 −1.2 −1.9 1.1 0.3];
Prepared: [0.2 −0.4 0.4 0.8 −0.2 −0.2 −0.2 0.3];
$O_2$: [0.1 −0.3 0.4 0.8 −0.1 −0.1 −0.1 0.2].

S2, by capturing a semantic feature vector in the first word vector, reasoning to obtain subjects and knowledge points in the learning target, determining a target knowledge point of the learning target, positioning and indexing the target knowledge point, and determining an association relationship of the target knowledge points.

As shown in FIG. 14, S2 includes the following steps.

S21, splicing the first word vector to obtain a semantic lexical item vector, and mining low-dimensional semantic information about the semantic lexical item vector by using manifold learning, and mapping the semantic lexical item vector to a low-dimensional vector; and capturing local semantic information about the part-of-speech change and the word order relationship in the low-dimensional vector by using a convolution neural network, and obtaining a semantic feature vector by the full connection layer non-linear transformation processing.

Here, the convolution neural network used is a one-dimensional convolution neural network layer.

S22, inputting the semantic feature vector into a self-encoding language model, outputting a compact semantic vector which implies multi-level abstraction and progressive relationships, performing random masking and fine-tuning on the compact semantic vector, and reasoning to obtain the semantics of subjects and knowledge points in the learning target. In this example, the semantics of "chemistry" subject and "generation of $O_2$ by $KMnO_4$" knowledge points are inferred.

S23, determining a target knowledge point of the learning target.

Figure 3:
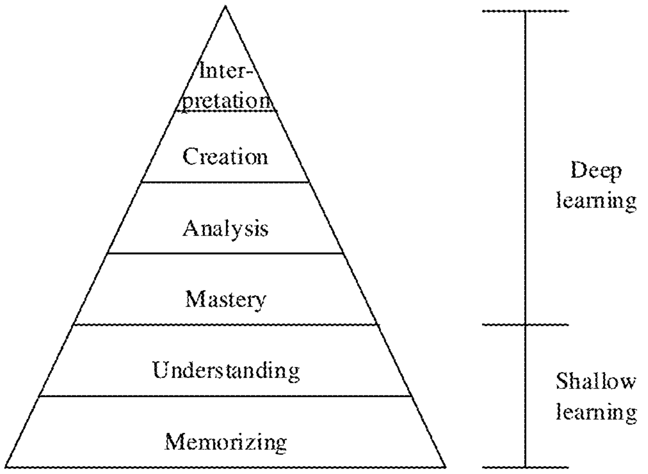
FIG. 3 is a schematic diagram of a Bloom hierarchy model according to an embodiment of the application.

Specifically, the shallow and deep learning strategies are used to construct a Bloom hierarchy model as shown in FIG. 3, which matches, obtains memory, understands, masters, analyzes, creates and interprets target verbs, derives subjects and knowledge points according to semantic inference, combines lexical item labeling of nouns and adjective category, and extracts "mastery+$O_2$ generation experiments" learning targets by using a "target verbs+target knowledge points" template.

S24, judging an association relationship between each knowledge point and a subject knowledge graph, and inserting the knowledge point into the subject knowledge graph.

Figure 4:
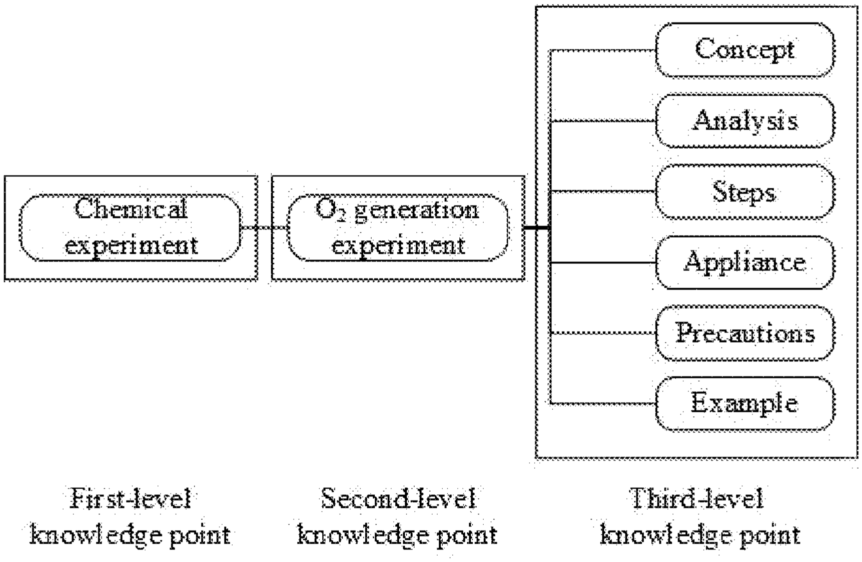
FIG. 4 is a schematic diagram of hierarchical relationships between knowledge points according to an embodiment of the application.

Specifically, the entry in the corpus are divided according to the part-of-speech, and the hierarchical relationship between the entry knowledge points is established according to the co-occurrence, similarity and semantic features of the entry. As shown in FIG. 4, the knowledge and concepts of the corpus text are analyzed, and the relationship between each knowledge point and the subject knowledge graph is judged, and inserted into the existing subject knowledge graph as a new node.

S25, according to a channel capacity of nodes in the knowledge graph, segmenting a sub-graph where the target knowledge point is located by using a maximum flow minimum cut method, recursing the sub-graph by using a breadth-first search method, locating and indexing the target knowledge point, and acquiring subject and location information corresponding to the target knowledge point.

According to the channel capacity between nodes in the knowledge graph, the sub-graph where the target knowledge point is located is searched and segmented by the maximum flow minimum cut algorithm. The sub-graph is recursed by using the breadth-first search traversal algorithm to locate and index the target knowledge point. The subject and location information of the knowledge point are obtained to realize the target knowledge point location.

The specific steps for searching the maximum flow minimum cut algorithm are as follows.

1. The flow value of all the nodes in the initialization knowledge graph is 1/N, where N is the number of nodes.
2. The flow value for each node is iteratively updated:

$$PR(i) = \frac{(1-d)}{N} + d \times \text{Sum}\left(\frac{PR(j)}{L(j)}\right);$$

where j represents a $j^{th}$ node connected to a node i, L (j) represents the out-degree of the $j^{th}$ node, and d=0.85 represents a damping coefficient.

3. The knowledge points of "chemical experiment" and "$O_2$ generation experiment" are used as a source point and a sink point, and defined as s, t.
4. All paths between s and t are traversed by using the Dickstra algorithm, with the sum of node flow values on a path taken as the flow value of the path.
5. The flow values of each path are sorted for selecting a path with the maximum flow value. The knowledge graph is divided into two sub-graphs $T_1$ and $T_2$ by using a minimum cut algorithm, where $T_1$ is a sub-graph composed of s and the nodes connected thereto, and $T_2$ is a sub-graph composed of t and the nodes connected thereto.
6. $T_2$ is determined as the subgraph where the target knowledge point of "$O_2$ generation experiment" is located.

S26, according to the position information about the target knowledge point, calculating the distance and similarity between the target knowledge point and its adjacent knowledge point by means of the k-nearest neighbor method, and determining an association relationship of the target knowledge point.

Specifically, according to the position information of the target knowledge point, the distance and similarity between the target knowledge point and the adjacent knowledge point corresponding to the entry is calculated by the k-nearest neighbor method based on distance measurement and similarity measurement. The number of knowledge points is set. The adjacent knowledge points are obtained. The adjacent, hierarchical, cross-reference and subject association relationships are determined by the random walk of the model of no offset return rate. The adjacent knowledge points "$KMnO_4$", "$O_2$", "redox reaction" and "reaction rate" relating to the "$O_2$ generation experiment" are denoted using $Z_1$, $Z_2$, $Z_3$ and $Z_4$.

$Z_1$: "$KMnO_4$", an inorganic compound, is commonly used in chemical laboratories and industries as an oxidizing agent. It can oxidize other substances, including reactions that produce oxygen.

$Z_2$: "$O_2$", a colorless, tasteless, and odorless gas, is widely found in nature. It is essential for biological respiration and many combustion processes.

$Z_3$: in a "redox reaction", $KMnO_4$, acts as an oxidant in the reaction to oxidize other substances to higher oxidation states while reducing themselves to lower valence manganese ions.

$Z_4$: "reaction rate", the rate of the $KMnO_4$ decomposition reaction is affected by a few factors, including temperature, concentration, catalyst, etc. The adjustment of these factors may control the rate of oxygen generation.

S3, matching the corresponding teaching scene based on the learning target, integrating the matched teaching scene and the association relationship between the subject and the knowledge point in the learning target into a teaching model.

Figure 15:
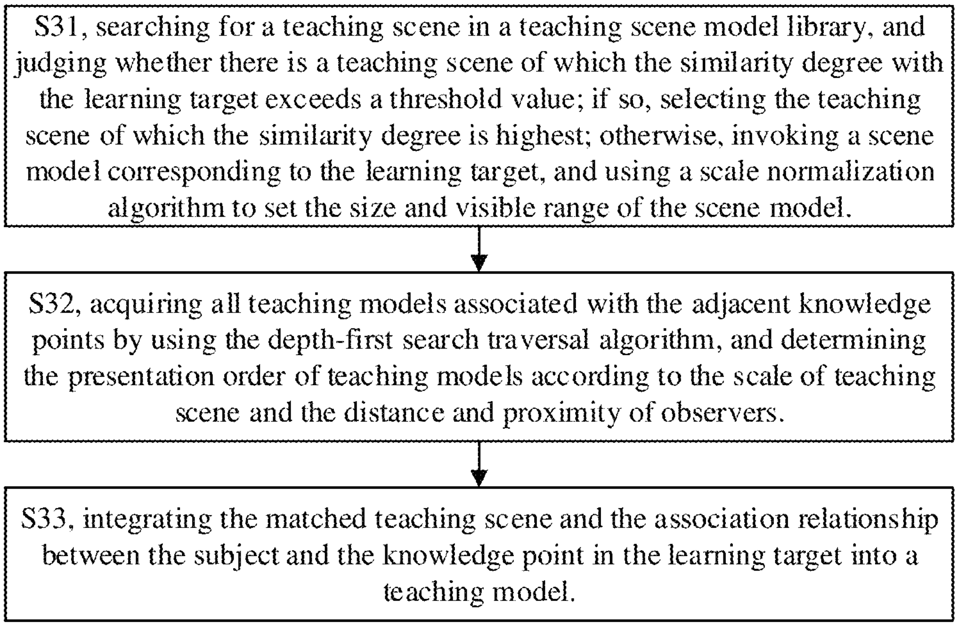
FIG. 15 is a flowchart of steps for integrating a teaching model according to an embodiment of the application.

As shown in FIG. 15, S3 includes the following steps.

S31, searching for a teaching scene in a teaching scene model library, and judging whether there is a teaching scene of which the similarity degree with the learning target exceeds a threshold value; if so, selecting the teaching scene of which the similarity degree is highest; otherwise, invoking a scene model corresponding to the learning target, and using a scale normalization algorithm to set the size and visible range of the scene model.

Figure 5:
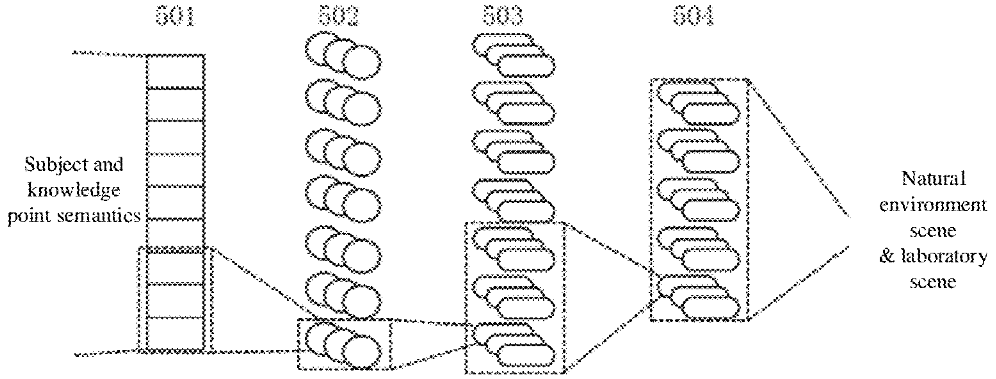
FIG. 5 is a schematic diagram of a classification model based on a multi-headed attention capsule network according to an embodiment of the application.

In particular, a classification model based on a multi-head attention capsule network as shown in FIG. 5 is applied, where 501 represents an attention layer, 502 represents a convoluted neural network layer, 503 represents a primary capsule layer, and 504 represents a convoluted capsule layer. the semantics of the subject and knowledge points where the learning target is located are input and pass the attention layer, the convolution nerve network layer, the primary capsule layer and the convolution capsule layer in turn for capturing the features of instruments and equipment, experimental devices, plants, animals and topographic and geomorphic elements in the semantics, outputting the laboratory and the natural environment scene categories, searching for features with similar attributes in the teaching scene category library according to the semantic features. If the similarity exceeds a certain threshold value, the teaching scene with the highest similarity is selected.

Figure 6:
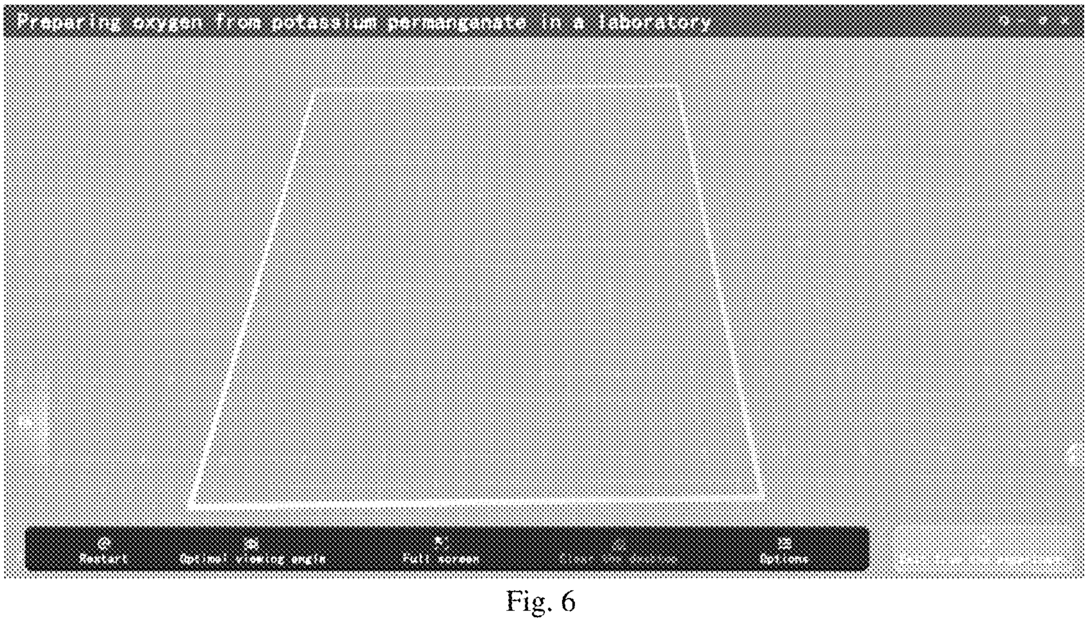
FIG. 6 is a schematic diagram showing a target size and a visual range of a teaching scene according to an embodiment of the application.

If the scene matched with the learning target is not found in the teaching scene model library, according to the subject knowledge field and knowledge structure, combined with the adjacent knowledge points of the learning target, the corresponding scene model is called, taking the coordinate system origin as the center, calculating the boundary box and the center point of the teaching scene by using the scale normalization algorithm, and setting the target size and the visible range of the scene as shown in FIG. 6.

Herein, the scale normalization algorithm calculates the boundary box and the central point by the following steps.

1. A position coordinate ($x_i$, $y_i$, $z_i$) of a scene element in the teaching scene is acquired, where i is the $i^{th}$ scene element, i=1, 2, . . . , n;
2. The minimum and maximum values of scene elements on the x, y, z axes are calculated:

$$x_{min}, x_{max} = \min(x_1, x_2, \ldots, x_n), \max(x_1, x_2, \ldots, x_n)$$

$$y_{min}, y_{max} = \min(y_1, y_2, \ldots, y_n), \max(y_1, y_2, \ldots, y_n);$$

$$z_{min}, z_{max} = \min(z_1, z_2, \ldots, z_n), \max(z_1, z_2, \ldots, z_n);$$

where min and max are respectively a minimum function and a maximum function.

3. The boundary box of the teaching scene is constructed by using minimum and maximum coordinates, with the eight vertex coordinates of the boundary box expressed as $(x_{min}, y_{min}, z_{min})$, $(x_{min}, y_{min}, z_{max})$, $(x_{min}, y_{max}, z_{min})$, $(x_{min}, y_{max}, z_{max})$, $(x_{max}, y_{min}, z_{min})$, $(x_{max}, y_{min}, z_{max})$, $(x_{max}, y_{max}, z_{min})$ and $(x_{max}, y_{max}, z_{max})$;

4. The length l, width w and height h of the teaching scene are calculated as:

$$l=x_{max}-x_{min};$$

$$w=y_{max}-y_{min};$$

$$h=z_{max}-z_{min}.$$

5. The coordinates of the center point of teaching scene are calculated as:

$$x_c=(x_{min}+x_{max})/2;$$

$$y_c=(y_{min}+y_{max})/2;$$

$$z_c=(z_{min}+z_{max})/2.$$

S32, acquiring all teaching models associated with the adjacent knowledge points by using the depth-first search traversal algorithm, and determining the presentation order of teaching models according to the scale of teaching scene and the distance and proximity of observers.

Specifically, according to the operation requirements and processes of various subjects, the position and direction of the observer in the teaching scene are set. According to the position, direction, intensity and color of the light source, and in combination with the scale of the virtual teaching scene, the position, posture and scaling parameters of the 3D teaching model are set, and the interactive behavior of each teaching model is automatically set.

S33, integrating the matched teaching scene and the association relationship between the subject and the knowledge point in the learning target into a teaching model.

Figure 7:
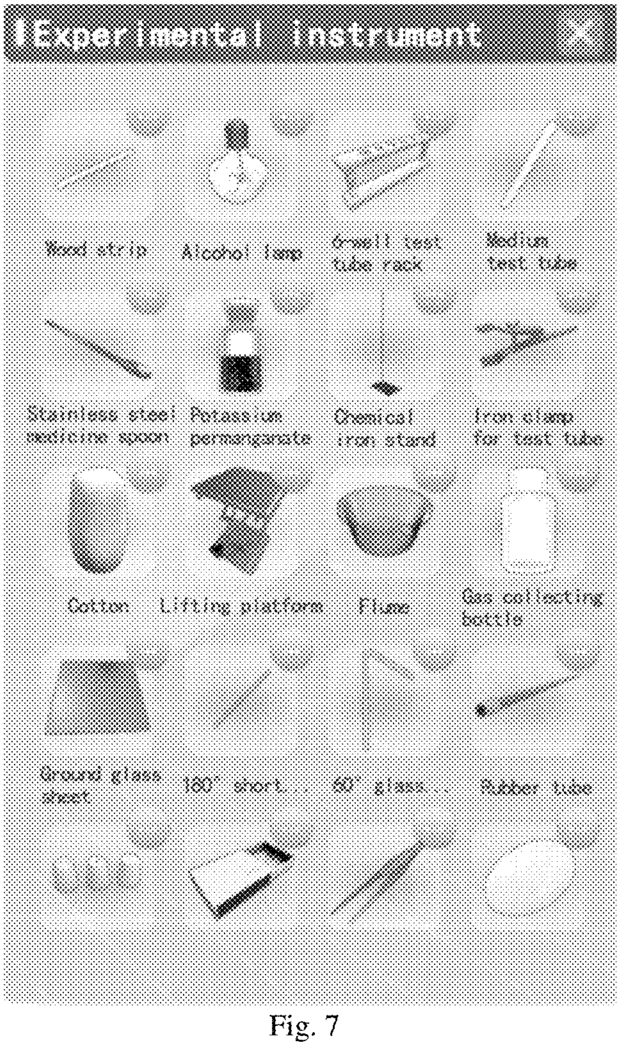
FIG. 7 is a schematic diagram of a teaching model label according to an embodiment of the application.

Specifically, 3D models of teaching aids and learning aids involved in the knowledge points of mathematics, physics, chemistry and science subjects in the basic education section are constructed by 3D modeling software, as shown in FIG. 7. Each 3D model is labeled with subject, knowledge point, purpose, name, and description information, associating geometry, material, and attribute information for the 60° glass delivery tube, rubber tube, 180° short glass delivery tube, rubber stopper, cotton, and $KMnO_4$ teaching models, depending on the use of the model.

Figure 8:
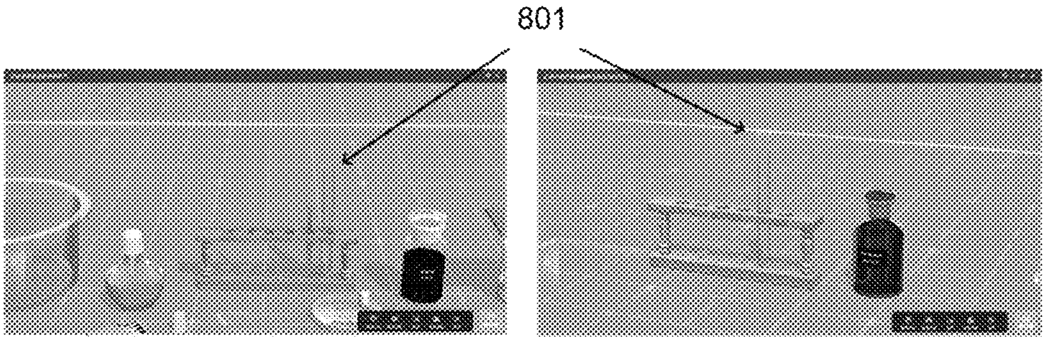
FIG. 8 is a schematic diagram of the same teaching model associated with different knowledge points according to an embodiment of the application.

According to the "subject-knowledge-name-use" level, the 3D teaching model is organized by the tree structure, and the attribute information of the teaching model is added to the nodes. As shown in FIG. 8, 801 represents a medium test tube. When the identical 3D educational model is linked to various knowledge nodes, the similarity matching algorithm is employed to clone the logical address of the 3D educational model into the corresponding knowledge node.

Figure 9:
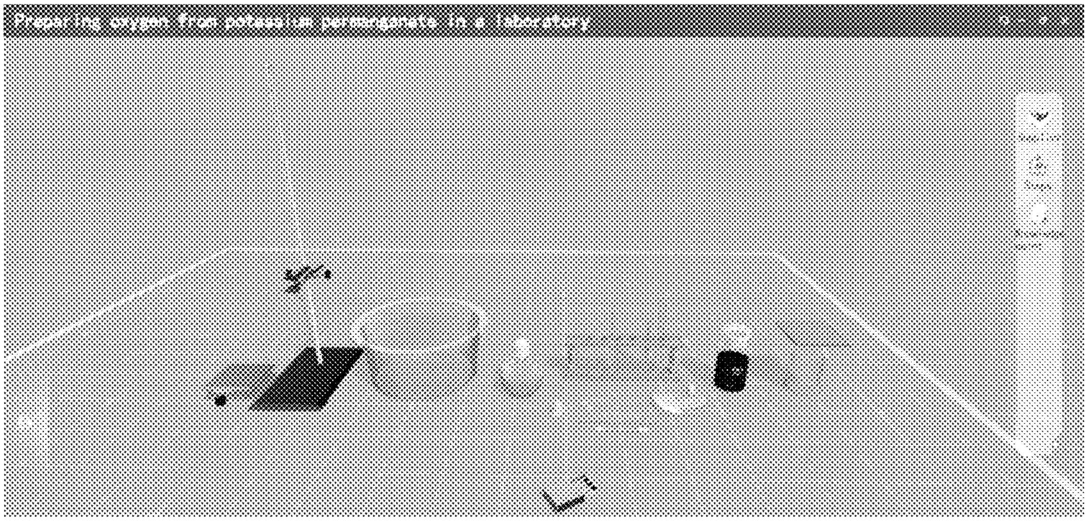
FIG. 9 is a schematic diagram of an aggregation of teaching models according to an embodiment of the application.

As shown in FIG. 9, according to the model required by the teaching scene, all the 3D teaching models associated with each knowledge point are acquired by using a depth-first traversal algorithm search. The position, attitude and scaling parameters of the 3D teaching model and the presentation order of each teaching model are determined according to the scale of the virtual teaching scene and the distance-proximity relationship between the teaching model and the observer.

S4, establishing an interaction relationship between each teaching model.

Specifically, the interaction relationship between different teaching models is extracted according to the subject to which the learning target belongs and the knowledge point semantics. The interaction behavior and events of each model are described and bound by the scripting language, the interaction relationship of teaching models in the scene is grouped, and the interaction network between the teaching models is constructed.

Figure 10:
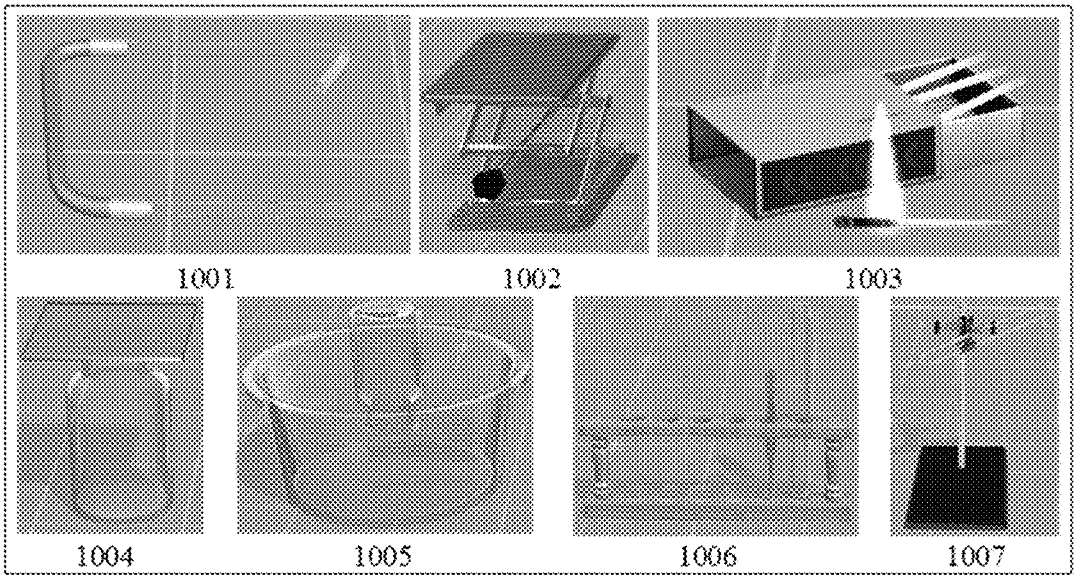
FIG. 10 is a schematic diagram showing the interaction relationship between different teaching models according to an embodiment of the application.

In this embodiment, according to the subject to which the learning target belongs and the knowledge point semantics, and in combination with the interaction relationships of various 3D models in physical experiments, chemical reactions, geometric figure evolution, primary science teaching aids and science experiments, the graph neural network is used to extract the interaction relationships of connection, separation, collision, attraction, repulsion, nesting and clamping combinations as shown in FIG. 10 between different teaching models. In FIG. 10, 1001 represents a connection interaction relationship. 1002 represents a separation interaction relationship. 1003 represents a collision interaction relationship. 1004 represents an attraction interaction relationship. 1005 represents a repulsion interaction relationship. 1006 represents a nesting interaction relationship. 1007 represents a clamping interaction relationship.

Figure 11:
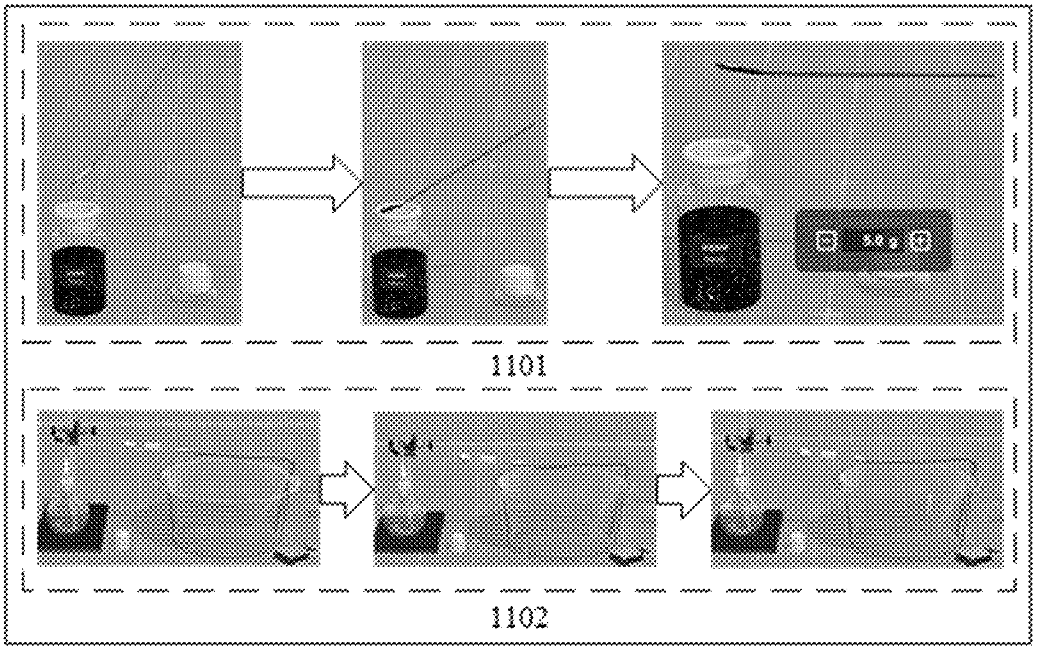
FIG. 11 is a schematic diagram showing the interactive behavior between teaching models according to an embodiment of the application.

Using simulation, interaction and behavior plug-ins, according to the functions of each 3D teaching model in the teaching scene, as shown in FIG. 11, 1101 indicates that $KMnO_4$ is loaded into the interaction behavior, 1102 indicates that $O_2$ generates the interaction behavior, with interaction behaviors of clicking, dragging, moving, zooming, exploring, linking, physical simulation, and interaction feedback effect of sound, vibration and light effect added to corresponding 3D model. The interaction behavior and events of each model are described and bound by the scripting language.

According to the relevance and internal logic of teaching content, the community discovery algorithm is used to realize the interaction relationship grouping of 3D teaching models in the scene, and the interactive network between models is constructed. The change of positional relationship between teaching models in the process of interaction is detected by the collision detection algorithm. The detected collision effect is simulated by a physical engine.

Example 2

With reference to FIG. 2, a semantic reasoning terminal 1 for a learning target in an education metaverse includes a memory 2, a processor 3 and a computer program stored on the memory 2 and running on the processor 3, where the processor 3, when executing the computer program, implements the steps of the semantic reasoning method for the learning target in the education metaverse of Example 1.

In summary, the application provides a semantic reasoning method and a terminal for a learning target in an education metaverse. A basic description text of the learning target input by a teacher in a learning target editor of the VR terminal is detected by a text input listener. The text is segmented into lexical item sequences by the hybrid word segmentation algorithm, and the part-of-speech labeling algorithm is used to label part-of-speech categories. The template of "Modified Terms+Central Terms" is used to identify, extract, or split entries. The lexical item to be segmented is extracted by using the forward maximum matching algorithm. It judges whether the lexical item to be segmented is an entry lexical item. The semantic weight value of the lexical item is calculated by using the TF-IDF algorithm, the lexical item sequence is sorted according to the weight value, and the semantic lexical item is extracted. A converter model is constructed to map semantic terms into word vectors, and the word vectors are normalized. The local semantic information in the vector is captured by the one-dimensional convolution neural network. The semantic feature vector is extracted by nonlinear transformation. A compact semantic vector is input by a deep Boltzmann machine to infer a subject and knowledge point semantics. The target verbs are matched, the category lexical items such as nouns and adjectives are labeled as target knowledge, and the learning targets are extracted by the template of "target verbs+target knowledge points". According to the co-occurrence, similarity and semantic features of entries, the hierarchical relationship between entry knowledge points is established. The target knowledge point is located and indexed by using the breadth-first search traversal algorithm to acquire subject and location information about the knowledge point. The adjacent knowledge points are obtained by the neighborhood algorithm. The adjacent, hierarchical, cross-reference and subject correlation relationships are determined by the random walk of the model of no offset return rate. We search the teaching scene in the teaching scene model library, and select the existing teaching scene with the feature similarity exceeding the threshold and being the highest. If the matching fails, it calls a corresponding scene model, the boundary box and the central point thereof are calculated by using the scale normalization algorithm, and the size and visible range of the scene are set. The position, posture and zoom parameters of teaching resources are set, automatically associating 3D teaching model interaction behaviors, and laying out teaching scenes. Each 3D model is labeled with subject, knowledge point, purpose, name, and description information according to the subject category and use of the model. The teaching model is organized by the tree structure, and the attribute information is added to leaf nodes. All teaching models associated with the adjacent knowledge points are acquired by using the depth-first search traversal algorithm, and it determines the presentation order of teaching models according to the scale of teaching scene and the distance and proximity of observers. The interaction relationship between different teaching models is extracted according to the subject to which the subject target belongs and the knowledge point semantics. The interaction behavior and events of each model are described and bound by the scripting language. The interaction relationships of different 3D teaching models are grouped by the community discovery algorithm to construct the interaction network of each model. In this way, it improves the accuracy of semantic extraction of the learning target and automatically associates teaching resources according to the extracted learning target.

The above description is only the embodiments of the application and do not limit the patent scope of the application. Any equivalent transformations made using the content of the description and drawings of the application, or the embodiments directly or indirectly applied in related technical fields, are also included in the scope of patent protection of the application.

What is claimed is:

1. A semantic reasoning method for a learning target in an education metaverse, comprising the steps of:

receiving a description text of an input learning target, segmenting the description text into a lexical item sequence, extracting an entry from the lexical item sequence, extracting a semantic lexical item based on the entry, and mapping the semantic lexical item into a first word vector;

by capturing a semantic feature vector in the first word vector, reasoning to obtain subjects and knowledge points in the learning target, determining a target knowledge point of the learning target, positioning and indexing the target knowledge points, and determining an association relationship of the target knowledge points;

wherein the reasoning to obtain subjects and knowledge points in the learning target by capturing the semantic feature vector in the first word vector comprises:

splicing the first word vector to obtain a semantic lexical item vector, and mining low dimensional semantic information about the semantic lexical item vector by using manifold learning, and mapping the semantic lexical item vector to a low-dimensional vector;

capturing local semantic information about a part-of-speech change and a word order relationship in the low-dimensional vector by using a convolution neural network, and obtaining the semantic feature vector by the full connection layer non-linear transformation processing;

inputting the semantic feature vector into a self-encoding language model;

outputting a compact semantic vector which implies multi-level abstraction and progressive relationships;

performing random masking and fine-tuning on the compact semantic vector; and reasoning to obtain the semantics of subjects and knowledge points in the learning target, wherein the positioning and indexing the target knowledge point and determining an association relationship of the target knowledge point comprises:

judging an association relationship between each knowledge point and a subject knowledge graph, and inserting the knowledge point into the subject knowledge graph;

according to a channel capacity of nodes in the subject knowledge graph, segmenting a subgraph where the target knowledge point is located by using a maximum flow minimum cut method, recursing the sub-graph by using a breadth-first search method, locating and indexing the target knowledge point, and acquiring subject and location information corresponding to the target knowledge point;

according to the position information about the target knowledge point, calculating the distance and similarity between the target knowledge point and its adjacent knowledge point by means of the k-nearest neighbor method, and determining an association relationship of the target knowledge point;

matching the corresponding teaching scene based on the learning target, integrating the matched teaching scene and the association relationship between the subject in the learning target and the target knowledge point into a teaching model; and establishing an interaction relationship between each teaching model, wherein the matching the corresponding teaching scene based on the learning target comprises:

searching for a teaching scene in a teaching scene model library, and judging whether there is a teaching scene of which the similarity degree with the learning target exceeds a threshold value; if so, selecting the teaching scene of which the similarity degree is highest; otherwise, invoking a scene model corresponding to the learning target and using a scale normalization algorithm to set the size and visible range of the scene model.

2. The semantic reasoning method for the learning target in the education metaverse according to claim 1, wherein the segmenting the description text into a lexical item sequence comprises:

segmenting the description text into the lexical item sequence by using hybrid lexical segmentation, and marking the part-of-speech of each lexical item in the lexical item sequence.

3. The semantic reasoning method for the learning target in the education metaverse according to claim 2, wherein the extracting an entry from the lexical item sequence comprises:

identifying and extracting independent terms and joint terms in the lexical item sequence;

using the independent term as a title of the learning target; and splitting the joint term, matching a corresponding subject entry library according to a subject category to which the title belongs, and extracting an entry corresponding to the title based on the splitting result of the joint term.

4. The semantic reasoning method for the learning target in the education metaverse according to claim 3, wherein the extracting a semantic lexical item based on the entry comprises:

acquiring a relationship feature vector of an entry and lexical item context, using a forward maximum matching method to extract a lexical item to be segmented in the entry and mapping same to a second word vector, and judging whether a splicing result between the second word vector and the relationship feature vector is an entry and lexical item by using a long short-term memory network classifier; and if so, calculating a semantic weight value of the entry and lexical item, sorting the entry and lexical item according to the weight value, and extracting a semantic lexical item according to the sorting result.

5. The semantic reasoning method for the learning target in the education metaverse according to claim 1, wherein the integrating the matched teaching scene and the association relationship between the subject in the learning target and the target knowledge point into a teaching model further comprises:

acquiring all teaching models associated with the adjacent knowledge points by using the depth-first search traversal algorithm, and determining the presentation order of teaching models according to the scale of teaching scene and the distance and proximity of observers.

6. The semantic reasoning method for the learning target in the education metaverse according to claim 1, wherein the establishing an interaction relationship between each teaching model comprises:

extracting the interaction relationship between different teaching models according to the subject to which the learning target belongs and the knowledge point semantics; and describing and binding the interaction behavior and events of each model by the scripting language, grouping the interaction relationship of teaching models in the scene, and constructing the interaction network between the teaching models.

7. A semantic reasoning terminal for a learning target in an education metaverse, comprising a memory, a processor and a computer program stored on the memory and running on the processor, wherein the processor, when executing the computer program, implements the steps of the semantic reasoning method for the learning target in the education metaverse according to claim 1.

* * * * *